US007275848B2

(12) United States Patent
Chinniah et al.

(10) Patent No.: US 7,275,848 B2
(45) Date of Patent: Oct. 2, 2007

(54) HEADLAMP ASSEMBLY HAVING COOLING CHANNEL

(75) Inventors: Jeyachandrabose N. Chinniah, Canton, MI (US); Edwin M. Sayers, Saline, MI (US); Harvinder Singh, Shelby Township, MI (US); James D. Tarne, West Bloomfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 58 days.

(21) Appl. No.: 11/059,049

(22) Filed: Feb. 16, 2005

(65) Prior Publication Data

US 2006/0181894 A1 Aug. 17, 2006

(51) Int. Cl.
*B60Q 1/04* (2006.01)
*F21V 29/00* (2006.01)

(52) U.S. Cl. ...................................... 362/547; 362/373

(58) Field of Classification Search ................ 362/547, 362/373, 345; 206/335
See application file for complete search history.

(56) References Cited

U.S. PATENT DOCUMENTS

| | | | | |
|---|---|---|---|---|
| 1,681,153 | A | 8/1928 | Johnston | |
| 3,309,565 | A | 3/1967 | Clark et al. | |
| 3,639,751 | A * | 2/1972 | Pichel | 362/261 |
| 3,840,734 | A * | 10/1974 | Oram | 362/267 |
| 4,168,522 | A | 9/1979 | van de Laarschot et al. | |
| 4,724,515 | A | 2/1988 | Matsuki et al. | |
| 4,931,912 | A | 6/1990 | Kawakami et al. | |
| 4,978,890 | A | 12/1990 | Sekiguchi et al. | |
| 5,172,973 | A | 12/1992 | Spada | |
| 5,406,467 | A | 4/1995 | Hashemi | |
| 5,947,592 | A | 9/1999 | Barlow | 362/345 |
| 6,045,248 | A | 4/2000 | Ashizawa | |
| 6,071,000 | A | 6/2000 | Rapp | |
| 6,183,114 | B1 | 2/2001 | Cook et al. | |
| 6,402,346 | B1 | 6/2002 | Liao et al. | |
| 6,497,507 | B1 | 12/2002 | Weber | |
| 6,558,026 | B2 | 5/2003 | Strazzanti | |
| 6,595,672 | B2 | 7/2003 | Yamaguchi | |
| 6,634,771 | B2 | 10/2003 | Cao | 362/294 |
| 6,676,283 | B2 | 1/2004 | Ozawa et al. | |
| 6,773,154 | B2 | 8/2004 | Desai | |
| 6,951,417 | B2 * | 10/2005 | Ito et al. | 362/547 |
| 7,021,793 | B2 * | 4/2006 | Biasoli et al. | 362/267 |
| 2002/0154514 | A1 | 10/2002 | Yagi et al. | |

(Continued)

FOREIGN PATENT DOCUMENTS

| | | |
|---|---|---|
| FR | 2698055 | 5/1994 |

(Continued)

*Primary Examiner*—Alan Cariaso
*Assistant Examiner*—Leah S Lovell
(74) *Attorney, Agent, or Firm*—Brinks Hofer Gilson & Lione

(57) ABSTRACT

A headlamp assembly for a motor vehicle is disclosed as having a light source, a chamber within which the light source is located, and a cooling channel extending through the chamber. The chamber substantially fluidly sealed from the atmosphere and the cooling channel is fluidly sealed from the chamber to prevent direct fluid exchange between the chamber and the channel. Heat exchange, however, is permitted between the chamber and the cooling channel. The heat exchange may be further promoted by a plurality of heat exchange fins extending away from the wall of the cooling channel.

19 Claims, 3 Drawing Sheets

U.S. PATENT DOCUMENTS

| | | | |
|---|---|---|---|
| 2003/0002179 | A1 | 1/2003 | Roberts et al. |
| 2003/0218885 | A1 | 11/2003 | Ishizaki |
| 2004/0012975 | A1 | 1/2004 | Chase et al. |
| 2004/0085768 | A1 | 5/2004 | Kai et al. |
| 2004/0120156 | A1 | 6/2004 | Ryan |
| 2004/0145909 | A1 | 7/2004 | Ognian et al. |
| 2004/0149054 | A1 | 8/2004 | Soga et al. |
| 2004/0213016 | A1 | 10/2004 | Rice |
| 2005/0024864 | A1 | 2/2005 | Galli |

FOREIGN PATENT DOCUMENTS

| | | |
|---|---|---|
| FR | 2701756 | 8/1994 |

* cited by examiner

HEADLAMP ASSEMBLY HAVING COOLING CHANNEL

BACKGROUND

1. Field of the Invention

The invention relates generally to a headlamp assembly for a motor vehicle. More specifically, the invention relates to the providing of airflow to cool the headlamp assembly.

2. Related Technology

Headlamp assemblies have a light source, such as a light emitting diode (LED), positioned within a headlamp chamber and electrically connected to a power source. The headlamp chamber is defined by a translucent lens located in front of the LED'S, and/or a reflector located surrounding the LED'S.

During operation cycle of the headlamp assembly, the LED'S and other components of the lamp generate heat while "on" and cools while "off", causing the chamber to undergoes temperature fluctuation and the air located within to expand and contract. To maintain a relative-constant chamber pressure, the chamber typically includes at least one opening that permits an air exchange between the chamber and the ambient air. However, to prevent contaminants, such as dust and debris, from entering the chamber, the opening is typically relatively small and is covered with an air-permeable membrane.

In order to attain designed optimal performance of LED'S and electrical components in the lamp, it is desirable to maintain the internal temperature of the lamp below the maximum operating temperature Therefore, it is advantageous to provide the headlamp assembly with a cooling mechanism that cools the chamber and the LED'S located therein.

In view of the above, it is beneficial to have a headlamp assembly that has a mechanism that effectively cools the mechanism's internal components. It is also desirable that the air exchanger is minimized to limit the contamination of the headlamp chamber.

SUMMARY

In overcoming the above limitations and other drawbacks, a headlamp assembly for a motor vehicle is provided that includes a light source, a chamber that receives the light source, a reflector and a cooling mechanism for the chamber. The cooling chamber permits some air exchange with ambient air, but is substantially fluidly sealed from the atmosphere. Any passageways into the chamber are covered with an air-permeable membrane to prevent dust and debris from entering the chamber. The cooling means includes a channel that is fluidly sealed from the chamber to prevent direct fluid exchange, such as air, between the chamber and the channel. Heat exchange, however, is permitted between the chamber and the channel.

In another aspect of the present invention, the heat exchange between the chamber and the channel may be promoted by a plurality of heat exchange fins extending away from the wall defining the cooling channel. Additionally, a thermoelectric device (TED) can be used to promote heat exchange between the chamber and the channel. The TED includes a metal plate having a first portion located on the inner surface of the wall defining the cooling channel and a second portion located on the outer surface of the wall. As electricity travels through the metal plate, the first portion becomes cooler than the second portion, thus promoting air from the chamber to undergo heat exchange with the air in the cooling channel.

In yet another aspect of the present invention, the cooling channel includes an air inlet positioned below an air outlet such that air flowing through the cooling channel rises from the inlet towards the outlet. Furthermore, longitudinal fins may be provided within the channel to define an air path and promote airflow through the channel.

As another aspect, the cooling channel may be provided with generally parallel front and back faces. Alternatively, the channel can have a cross-section that is generally circular. Furthermore, the headlamp assembly may include a plurality of cooling channels extending through the chamber.

Further objects, features and advantages of this invention will become readily apparent to persons skilled in the art after a review of the following description, with reference to the drawings and claims that are appended to and form a part of this specification.

DETAILED DESCRIPTION

Figure 1:
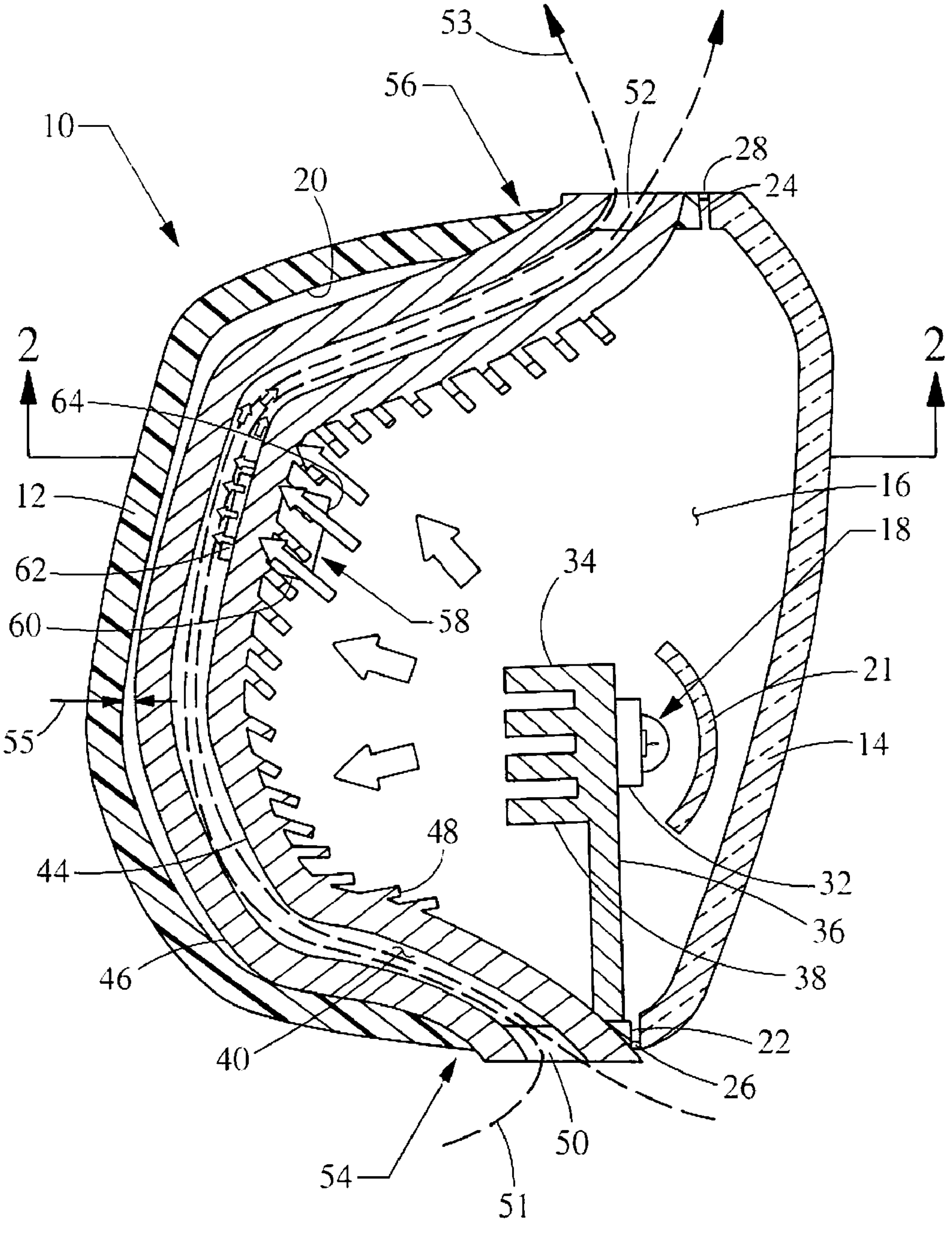
FIG. 1 shows a cross-sectional view of a headlamp assembly for a motor vehicle embodying the principles of the present invention.

Referring now to the drawings, FIG. 1 shows a headlamp assembly 10 having a housing 12 and a lens 14 cooperating to define a chamber 16 for a light emitting device 18, such as a light emitting diode (LED). The housing 12 includes a light-reflecting interior surface 20 that directs light towards the lens 14 and focuses the rays of light into a beam having desired characteristics. The housing 12 may also include a second interior surface 21 that focuses the light into a beam. The housing 12 is composed of a thermally-insulating material, such as plastic, the lens 14 is composed of a transparent or translucent material, such as glass or plastic. While any appropriate material may be used, both the housing 12 and the lens 14 are typically molded components.

The housing 12 and the lens 14 connect to each other such that the chamber 16 is substantially sealed from the atmosphere. However, the chamber 16 is provided with a pair of pressure vents for 22, 24 the air located within the chamber 16. More specifically, the vents 22, 24 are both relatively small openings between the housing 12 and the lens 14 that permit a relatively small airflow into and out of the chamber 16 to account for air density fluctuations during temperature changes within the chamber 16. Alternatively, the number of vents in the headlamp assembly 10 may change as required by design.

In order to further restrict airflow into the chamber 16, and to prevent contaminants such as dust and debris from entering the chamber, vent covers 26, 28 are positioned over the vents 22, 24. The vent covers 26, 28 also substantially prevent moisture from accumulating within the chamber 16 by permitting moisture to drain out of the vents 22, 24 while preventing moisture from entering into the chamber 16. The vent covers 26, 28 shown in the figures are thus composed of an air-permeable membrane, such as GORE-TEX, but any appropriate material may be used.

The LED 18 is attached to a printed circuit board (PCB) 32 that includes electronic controls and/or wiring for the LED 18. Furthermore, the LED 18 and the PCB 32 are supported by a heat sink 34 having a support post 36 and heat exchange fins 38. The heat sink 34 is constructed of a heat-conducting material, such as metal, and is connected to the housing 12 via the support post 36 to support the LED 18 and any electrical connections extending from the LED 18 to a power source.

During operation of the headlamp assembly 10, the LED 18 generates heat and increases the temperature of the air located within the chamber 16 and the components defining the chamber 16. However, the LED 18 and/or the electronic components connected to the LED 18 may experience diminished performance or failure if their maximum operating temperature is exceeded. To avoid this, the headlamp assembly 10 includes a cooling channel 40 that extends through and extracts heat from the chamber 16.

Figure 2:
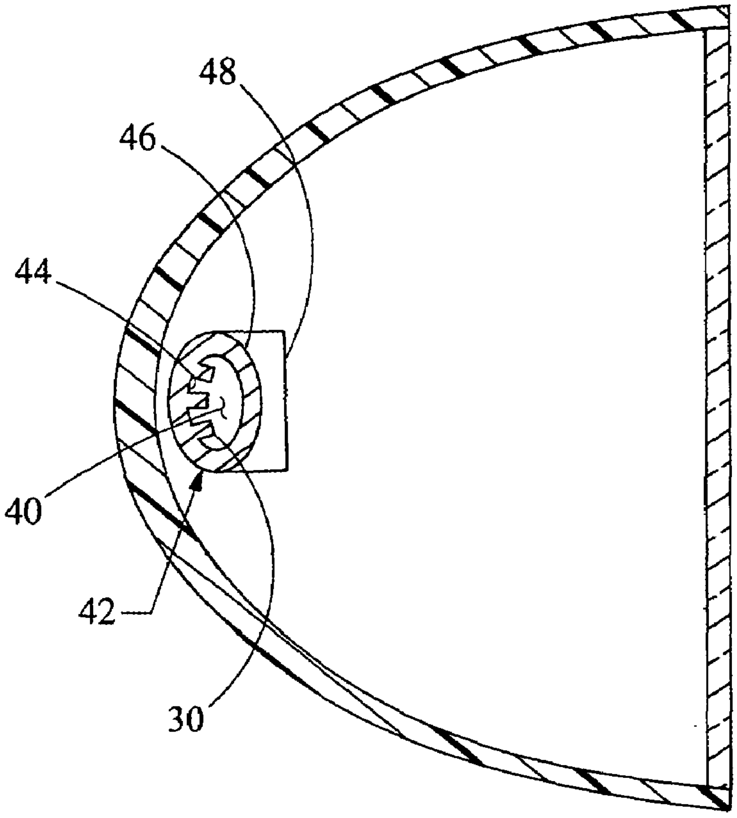
FIG. 2 is a cross-section taken along line 2-2 in FIG. 1 showing the cooling channel.

Referring now to both FIGS. 1 and 2, the cooling channel 40 is defined by a hollow tube 42 having a generally oval cross section. The larger face of the oval shape is exposed to the LED 18 to maximize heat exchange between the chamber 16 and the channel 40. An inner surface 44 of the tube 42 defines a conduit that is sealed from direct fluid communication with the chamber 16. This prevents undesirable excess airflow into the chamber 16. An outer surface 46 of the tube, however, is directly exposed to the chamber 16 to promote heat exchange therewith. To further promote the exchange of heat, the tube 42 is composed of a heat-conductive material such as metal. If desired, a plurality of heat exchange fins 48 may extend from the outer surface 46, toward the LED 18, to further promote heat exchange between the various components.

The tube 42 is spaced apart from the housing 12 by an air gap 55 to allow heat exchange to occur through the entire periphery of the tube 42. However, the headlamp assembly 10 may alternatively include a partition wall extending through the chamber 16 and cooperating with a portion of the housing 12 to define a channel.

Referring back to FIG. 1, the cooling channel 40 includes an inlet 50 for receiving a relatively cool inlet airflow 51 and an outlet 52 for venting a relatively warm outlet airflow 53. The inlet 50, positioned adjacent to the bottom 54 of the housing 12, is lower than the outlet 52, positioned adjacent to the top 56 of the housing, to promote airflow through the channel 40. More specifically, the natural property of hot air rising causes the heated air within the channel 40 to flow out of the outlet through natural convection. Therefore, even while the vehicle is stationary, the cool inlet airflow 51 is naturally drawn into the channel 40 from the atmosphere. Furthermore, the channel 40 includes a plurality of vanes 30 extending longitudinally there along, as shown in FIG. 2, to direct airflow through the channel 40.

The inlet 50 is positioned with respect to the motor vehicle such that a heavy stream of cool air from the atmosphere flows to the inlet 50 while the vehicle is moving. More specifically, an air duct or opening through a front portion of the vehicle body is positioned near the inlet 50. Furthermore, the inlet is not positioned near a heat source, such as the engine. Both the inlet 50 and the outlet 52 are also substantially unobstructed by vehicle components such that flow through the channel 40 is maximized.

A thermoelectric device (TED) 58 is positioned within the headlamp assembly 10 to further promote heat exchange between the chamber 16 and the channel 40. More specifically, the TED 58 includes a plate 60 extending through the tube 42 and having a first portion 62 extending into the cooling channel 40 and a second portion 64 extending into the chamber 16. The TED 58 includes a semiconductor having P-type and N-type electrons, as is known in the art. As an electrical current from a power source (not shown) travels through the TED 58, thereby aligning the P-type and N-type electrons within the semiconductor, a temperature differential forms between the first portion 62 and the second portion 64. More specifically, as the current travels through the TED 58, the first portion 62 becomes cooler and the second portion 64 becomes hotter. This temperature differential further increases the heat exchange between the respective components 16, 40 by drawing an increased amount of heat into the cooling channel 40.

Alternatively, the TED 58 may be installed in a reverse manner such that the first portion 62 is within the chamber 16 and the second portion 64 is located exterior of the channel 16, such as in the ambient air. The presence of the cooled first portion within the chamber 16 serves to directly cool the air within the chamber 16. It may be less desirable to position the second portion 64 within the cooling channel 40 because its presence may reduce airflow through the channel 40.

Figure 3:
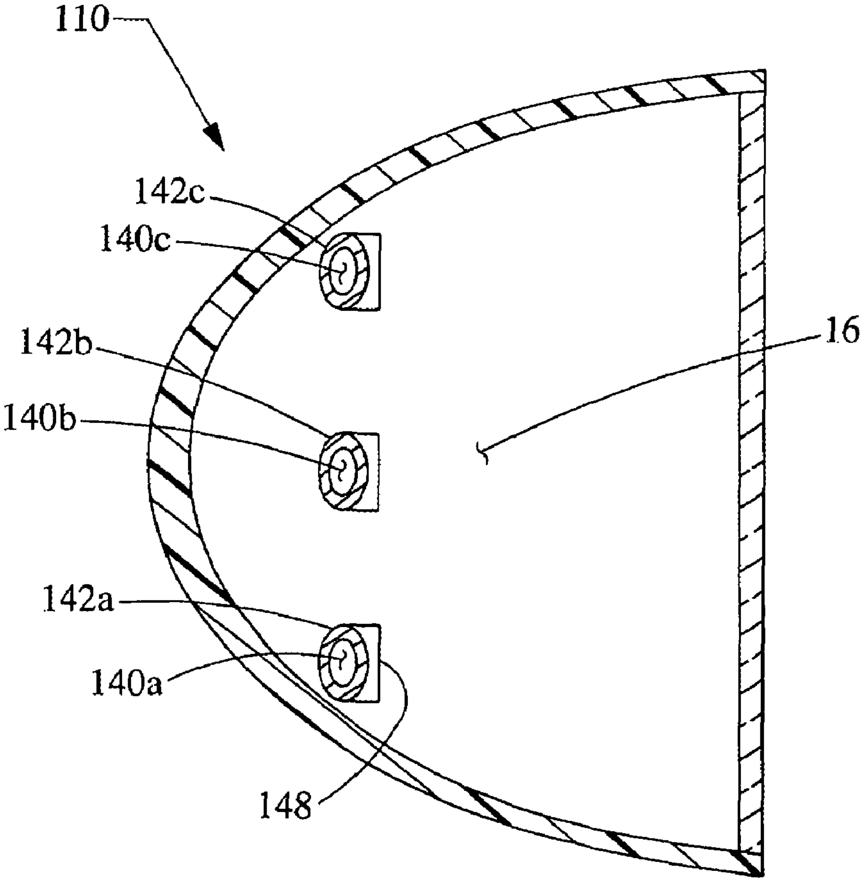
FIG. 3 is a cross-section generally similar to FIG. 2 of an alternative embodiment of the present invention.

Referring now to FIG. 3, an alternative embodiment of the present invention is shown. More specifically, a plurality of channels 140*a*, 140*b*, 140*c* defined by a plurality of tubes 142*a*, 142*b*, 142*c* extend through the chamber 16 of a headlamp assembly 110. The channels 140*a-c* in this design have generally oval cross sectional shapes and each have a smaller cross-sectional area than that of the design shown in FIGS. 1-2. However, the positioning of the multiple channels across the chamber 16 may cool the headlamp assembly 10 more evenly. The tubes 142*a-c* may also each have heat exchange fins 148 extending therefrom.

Figure 4:
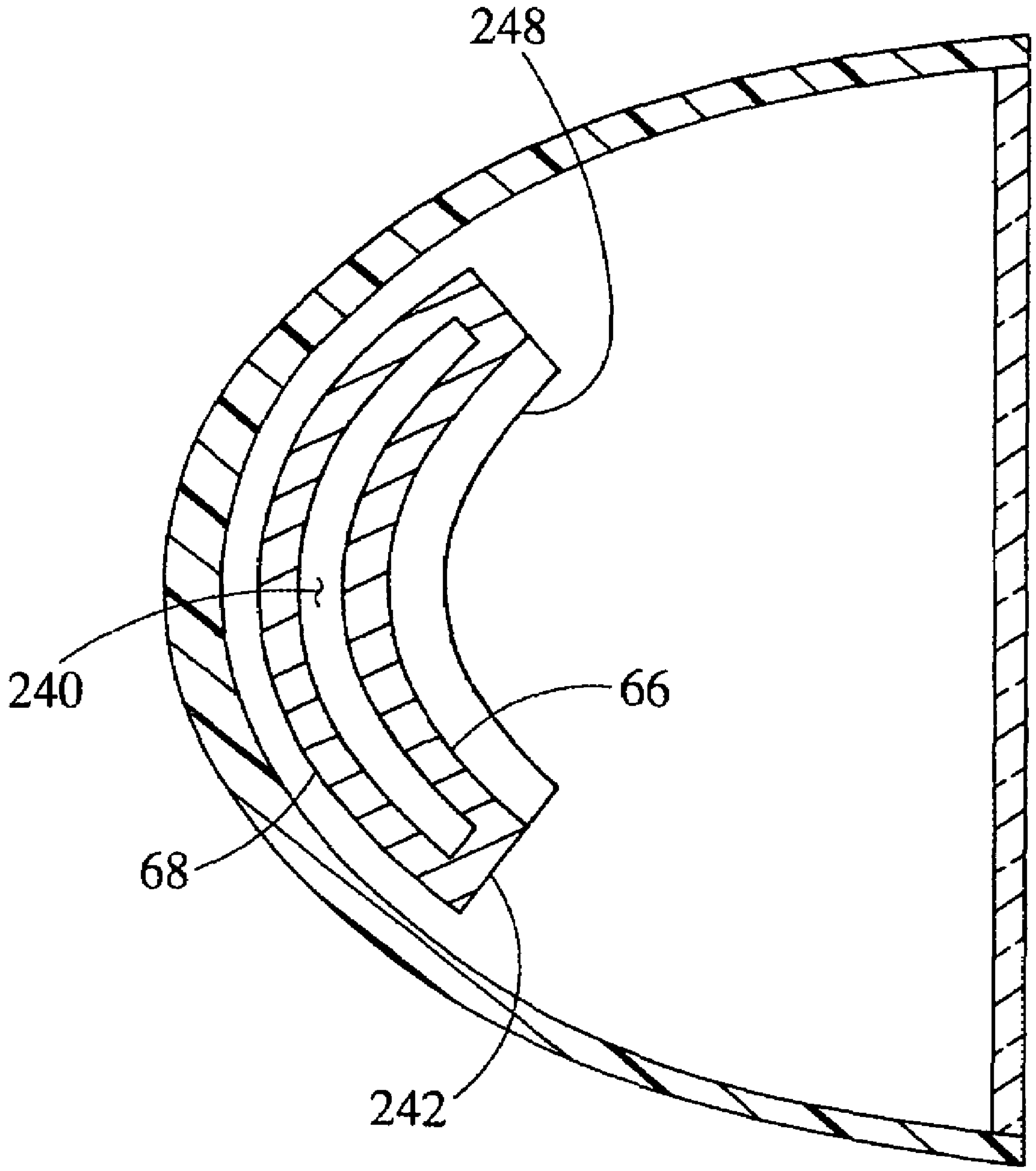
FIG. 4 is a cross-section similar to FIG. 2 of another alternative embodiment of the present invention.

Shown in FIG. 4 is another alternative embodiment of the present invention. In this embodiment, a single channel 240, defined by a tube 242, extends through the chamber 16 of a headlamp assembly 210. The channel 240 in this design has generally parallel front and back walls 66, 68. Furthermore, the tube 242 has heat exchange fins 248 extending therefrom.

It is therefore intended that the foregoing detailed description be regarded as illustrative rather than limiting, and that it be understood that it is the following claims, including all equivalents, that are intended to define the spirit and scope of this invention.

What is claimed is:

1. A headlamp assembly for a motor vehicle comprising:

a first wall at least partially defining a chamber that is substantially fluidly sealed from the atmosphere;

a light source located within the chamber; and a second wall at least partially defining a coolant channel through the chamber to exchange heat between the chamber and the channel, the channel being fluidly sealed from the chamber to prevent direct fluid exchange between the chamber and the channel, the channel terminating at an inlet and an outlet in fluid communication outside of the chamber.

2. A headlamp assembly as in claim 1, further comprising a plurality of fins extending away from the second wall and promoting the exchanger of heat between the chamber and the channel.

3. A headlamp assembly as in claim 1, wherein the second wall includes an inner surface that defines the channel and an outer surface that is exposed to the light source.

4. A headlamp assembly as in claim 3, further comprising a thermoelectric device coupled to the second wall and promoting the heat exchange between the chamber and the channel.

5. A headlamp assembly as in claim 4, wherein the thermoelectric device includes a semiconductor that promotes a temperature differential between the inner and the outer surfaces of the second wall.

6. A headlamp assembly as in claim 5, wherein the thermoelectric device includes a plate having a first portion extending into the channel and a second portion extending into the chamber.

7. A headlamp assembly as in claim 6, wherein the thermoelectric device is in electrical connection with a power source such that the first portion has a first temperature and the second portion has a second temperature greater than the first temperature.

8. A headlamp assembly as in claim 3, wherein the inner surface of the second wall including a plurality of vanes extending along the channel to promote airflow through the channel.

9. A headlamp assembly as in claim 1, wherein the inlet is positioned below the outlet.

10. A headlamp assembly as in claim 1, further comprising a third wall at least partially defining a second channel that extends through the chamber to permit heat exchange between the chamber and the second channel, wherein the second channel is fluidly sealed from the chamber to prevent direct fluid exchange between the chamber and the second channel.

11. A headlamp assembly as in claim 10, further comprising a fourth wall at least partially defining a third channel that extends through the chamber to permit heat exchange between the chamber and the third channel, wherein the third channel is fluidly sealed from the chamber to prevent direct fluid exchange between the chamber and the third channel.

12. A headlamp assembly comprising:

a light source;

an outer housing having a front wall and a rear wall defining a chamber that is substantially fluidly sealed from the atmosphere, the light source being located within the chamber; and an inner housing positioned within the chamber and spaced apart from each of the front and rear walls, the inner housing defining a channel that extends through the chamber to permit heat exchange between the chamber and the channel, wherein the channel is fluidly sealed from the chamber to prevent direct fluid exchange between the chamber and the channel.

13. A headlamp assembly as in claim 12, further comprising a plurality of fins extending away from the inner housing and promoting the heat exchange between the chamber and the channel.

14. A headlamp assembly as in claim 12 further comprising a thermoelectric device promoting the heat exchange between the chamber and the channel.

15. A headlamp assembly as in claim 14, wherein the thermoelectric device has a plate having a first portion positioned within the channel and a second portion positioned within the chamber, the thermoelectric device in electrical connection with a power source such that the first portion has a first temperature and the second portion has a second temperature greater than the first temperature.

16. A headlamp assembly as in claim 12, wherein the channel includes an inlet and an outlet, the inlet positioned below the outlet such that air flowing through the channel rises from the inlet towards the outlet.

17. A headlamp assembly as in claim 12 wherein the channel has generally parallel front and back faces.

18. A headlamp assembly as in claim 12, further comprising:

a third wall at least partially defining a second channel that extends through the chamber to permit heat exchange between the chamber and the second channel, wherein the second channel is fluidly sealed from the chamber to prevent direct fluid exchange between the chamber and the second channel; and a fourth wall at least partially defining a third channel that extends through the chamber to permit heat exchange between the chamber and the third channel, wherein the third channel is fluidly sealed from the chamber to prevent direct fluid exchange between the chamber and the third channel.

19. A headlamp assembly as in claim 18, wherein each of the first, second, and third channels having a generally-circular cross-section.

* * * * *